United States Patent
Shashidhar et al.

(10) Patent No.: US 12,488,019 B2
(45) Date of Patent: Dec. 2, 2025

(54) FACILITATING AUTOMATIC ENABLED REPLICATION FOR DETECTED STORAGE CONTEXT IN ADVANCED COMMUNICATION NETWORKS

(71) Applicant: Dell Products L.P., Round Rock, TX (US)

(72) Inventors: Rashmi Shashidhar, Bangalore (IN); Bathulwar Akash, Bangalore (IN); Rekha MS, Karnataka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/651,192

(22) Filed: Apr. 30, 2024

(65) Prior Publication Data
US 2025/0335463 A1    Oct. 30, 2025

(51) Int. Cl.
*G06F 16/27* (2019.01)

(52) U.S. Cl.
CPC .................... *G06F 16/27* (2019.01)

(58) Field of Classification Search
CPC ...... G06F 16/27; G06F 16/273; G06F 16/275; G06F 16/278
USPC ........................................................ 707/634
See application file for complete search history.

(56) References Cited

U.S. PATENT DOCUMENTS

| | | | | |
|---|---|---|---|---|
| 9,164,691 B1* | 10/2015 | Chopra | .................. | G06F 3/067 |
| 9,477,661 B1* | 10/2016 | Chamness | ........... | G06F 11/1464 |
| 10,002,173 B1* | 6/2018 | Ramachandran | ..... | G06F 16/273 |
| 10,740,025 B1* | 8/2020 | Wolfson | ................ | G06F 3/0659 |
| 2005/0203908 A1* | 9/2005 | Lam | ........................ | H04L 41/22 |
| 2012/0054155 A1* | 3/2012 | Darcy | ................. | G06F 11/2094 |
| | | | | 707/654 |
| 2021/0216572 A1* | 7/2021 | Braghin | ................ | G06F 16/278 |
| 2021/0373770 A1* | 12/2021 | Nandan | .................... | G06F 3/067 |
| 2022/0083251 A1* | 3/2022 | Saad | ........................ | H04L 69/14 |
| 2024/0134562 A1* | 4/2024 | Mohanty | ............... | G06F 3/0685 |
| 2024/0202078 A1* | 6/2024 | Ur Rahman | ........... | G06N 20/00 |

* cited by examiner

*Primary Examiner* — Michael Pham
(74) *Attorney, Agent, or Firm* — Amin, Turocy & Watson, LLP

(57) ABSTRACT

Facilitating auto enable replication for detected storage context in advanced communication networks is described. An example method includes determining, by a system comprising at least one processor, that data stored in a source system is to be replicated to a target system. The method also includes, based on historical data related to a storage context, determining, by the system, a replication policy for a replication of the data to the target system. The replication policy can include at least one rule utilized to replicate the data to a remote system. Further, the method includes, based on an acceptance of the replication policy, facilitating, by the system, the replication of the data to the target system according to the replication policy. In an example, the storage context can include a combination of information indicative of one or more parameters used to define the replication policy.

20 Claims, 10 Drawing Sheets

FACILITATING AUTOMATIC ENABLED REPLICATION FOR DETECTED STORAGE CONTEXT IN ADVANCED COMMUNICATION NETWORKS

BACKGROUND

The use of computing devices is ubiquitous. Distributed storage systems and/or object storage systems can provide a wide range of storage services while achieving high scalability, availability, and serviceability. An example of such storage systems is referred to as elastic cloud storage (ECS), which uses the latest trends in software architecture and development to achieve the above noted services, as well as other services.

Data replication is a process where the same data is stored on multiple storage devices. For example, the multiple copies of data can be stored in various locations to help ensure availability and reliability of the data. However, distributed storage systems and/or object storage systems do not provide proper support for automatic data replication.

The above-described context with respect to distributed storage systems and/or object storage systems is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An embodiment relates to a method that includes determining, by a system comprising at least one processor, that data, stored in a source system, is to be replicated to a target system. The method also includes, based on historical data related to a storage context, determining, by the system, a replication policy for a replication of the data to the target system. The replication policy can include at least one rule utilized to replicate the data to a remote system. Further, the method includes, based on an acceptance of the replication policy, facilitating, by the system, the replication of the data to the target system according to the replication policy. In an example, the storage context can include a combination of information comprising parameter information indicative of at least one parameter used to define the replication policy.

According to some implementations, the method can include, prior to the determining of the replication policy, receiving, by the system, user reinforced feedback data associated with a previous replication of data from the source system to the target system or another target system. Determining of the replication policy can include determining the replication policy based on the historical data and the user reinforced feedback data.

In some implementations, determining of the replication policy can include training, by the system employing artificial intelligence, a model using historical storage array data as training input. The training can include training the model to a defined confidence level, resulting in a trained model. In addition, determining of the replication policy can include, based on the trained model, facilitating, by the system, implementation of a storage context aware replication policy.

Further to the above implementations, the method can include, based on the facilitating of the implementation of the storage context aware replication policy, receiving by the system, feedback data. The method can also include retraining, by the system, the model based on the feedback data, resulting in a retrained model.

The method can include, according to some implementations, assigning, by the system, respective weights to replication policy parameters. The respective weights can identify user preferences. In accordance with some implementations, the method can include, based on a rejection of the replication policy, facilitating, by the system, customization of the replication policy.

In some implementations, determining of the replication policy can include determining a recovery point objective for the replication. According to some implementations, determining of the replication policy can include selecting the target system from a group of target systems. The selecting can be based on the storage context of the target system as compared to other storage contexts of the other target systems of the group of target systems. In some implementations, determining of the replication policy can include selecting a default policy based on a predefined replication policy metric.

Another embodiment relates to a system that includes at least one processor and at least one memory that stores executable instructions that, when executed by the at least one processor, facilitate performance of operations. The operations can include determining that data, stored in a source system, is scheduled for replication to a target system. The operations can also include, based on historical storage context data, determining a replication policy for the replication of the data to the target system. Further, the operations can include, based on acceptance of the replication policy, causing the replication of the data to the target system. For example, the historical storage context data can include information indicative of parameters used to define the replication policy.

In some implementations, the operations can include, prior to determining of the replication policy, receiving user reinforced feedback data associated with a previous replication of data from the source system to the target system or another target system. Determining of the replication policy can include determining the replication policy based on the storage context data and the user reinforced feedback data.

According to some implementations, determining of the replication policy can include, based on employing historical storage array data as training input, training via employing artificial intelligence, a model to a defined confidence level, resulting in a trained model. In addition, based on the trained model, determining of the replication policy can include causing a storage context aware replication policy to be implemented. Further to these implementations, the operations can include, based on the causing of the storage context aware replication policy to be implemented, receiving feedback data, and retraining the model based on the feedback data, resulting in a retrained model.

In some implementations, determining of the replication policy can include selecting the target system from a group of target systems, wherein the selecting is based on the historical storage context data of the target system. The operations can include, according to some implementations, assigning respective weights to replication policy parameters. In an example, the respective weights can identify user preferences.

Yet another embodiment relates to a non-transitory machine-readable medium, comprising executable instructions that, when executed by at least one processor of network equipment, facilitate performance of operations. The operations can include determining that data, stored in a source system, is to be replicated to a target system and, based on historical data related to a storage context, determining a replication policy for a replication of the data to the target system. The operations can also include, based on an acceptance of the replication policy, facilitating the replication of the data at the target system according to the replication policy.

In some implementations, determining of the replication policy can include training, using machine learning, a model using historical storage array data as training input. The training can include training the model to a defined confidence level, resulting in a trained model. Further, determining of the replication policy can include, based on the trained model, enforcing a storage context aware replication policy.

The operations can include, according to some implementations, based on the enforcing of the storage context aware replication policy, receiving feedback data. The operations can also include retraining the model based on the feedback data, resulting in a retrained model and enforcing the storage context aware replication policy based on the retrained model.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
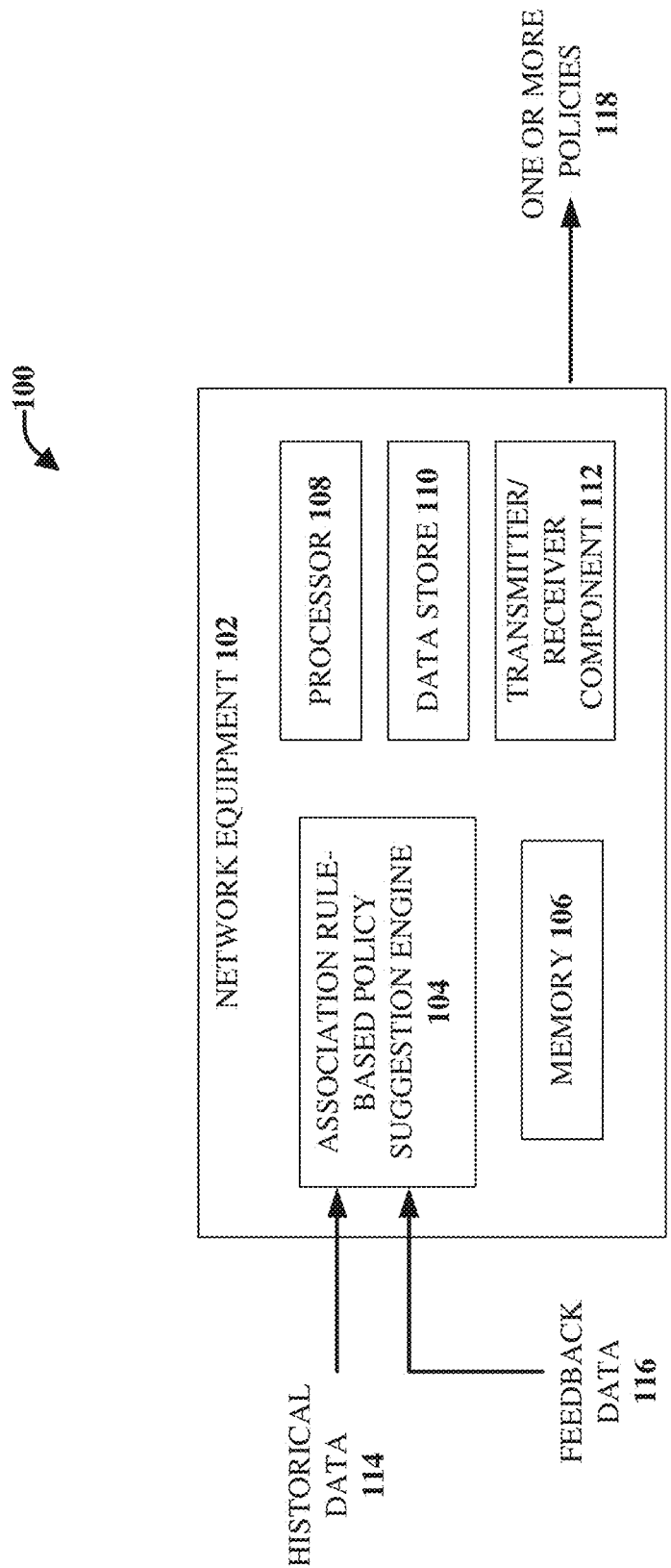
FIG. 1 illustrates an example, non-limiting, system that facilitates automation of a replication policy in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

In conventional distributed storage system networks, entities (referred to as users herein) are not able to leverage apparatuses and/or technologies that are available for replicating data from a source system to a remote system. This inability can be based on an insufficient understanding and/or lack of experience with their data. Additionally, or alternatively, the inability to leverage the apparatuses and/or technologies can be based on application behavior and/or compliance norms (e.g., standards of behavior).

An example of a problem faced by users is that, conventionally, users manually set one or more replication policies for replicating data to the remote system. For example, conventionally, there is no way to automatically apply a replication policy to users (e.g., associated user equipment) based on a detected known storage context. In another example, users might not know how to efficiently manage their storage since the users do not have enough data to decide what the replication policy should be and/or what parameters should be included in the replication policy.

As discussed herein, there can be a large amount of historical data that can be used for detection of various known storage contexts to automatically suggest a replication policy. Automation and policy-based replication coupled with deep insight of data can help alleviate user frustration and associated costs, as well as help insure compliance adherence. Therefore, as discussed herein, provided is automation of replication policy formation based on historical data and a user reinforced feedback loop, which can achieve better accuracy and agility as compared to conventional methods. Further, the disclosed aspects can improve processing efficiency as it relates to data replication since such replication is managed in order to replicate the data to an appropriate target system and according to appropriate replication policies.

As utilized herein "replication capacity" is the overall storage capacity of a Network Attached Storage (NAS) Server and File system objects to be replicated. An "NAS server" is a centralized file server, which allows multiple users to store and share files over a Transmission Control Protocol/Internet Protocol (TCP/IP) network. A "File System" is a method and data structure used to control how data is stored and retrieved.

"Storage context" is a combination of information indicative of one or more parameters. These parameters can include, but are not limited to: hardware type, workload (e.g., database), replication capacity, historical Recovery Point Objective (RPO) data, configured remote system parameters (e.g., network latency, Input/Output (IO) load, capacity of remote system (storage)), and other parameters that can be used to define a replication policy. The "Replication Policy" is a set of rules utilized to replicate to a remote system.

Further, as utilized herein a "workload" specifies the type of storage access pattern (e.g., logs only workload (Write intensive), Database workload (Read-write intensive), and so on). An "Efficient Replication policy" is defined based on one or more user preferences (e.g., most followed practices). A "CloudIQ" is a Data Lake (e.g., a centralized repository that allows for the storage of structured data and/or unstructured data) of aggregated storage context data collected from various machines and user install base. A "remote system" is a destination system (or target system) used to replicate data from a source system.

FIG. 1 illustrates an example, non-limiting, system 100 that facilitates automation of a replication policy in accordance with one or more embodiments described herein. The system includes network equipment 102, which can include an association rule-based policy suggestion engine 104 (e.g., an ARBPSE component). The network equipment 102 also includes at least one memory 106, at least one processor 108, at least one data store 110 (or at least one storage device), and a transmitter/receiver component 112. The at least one memory 106 can store computer executable components and instructions. The at least one processor 108 can facilitate execution of the instructions (e.g., computer executable components and corresponding instructions). As depicted, in some embodiments, one or more of: the association rule-based policy suggestion engine 104, the at least one memory 106, the at least one processor 108, the at least one data store 110, and the transmitter/receiver component 112 can be electrically, communicatively, and/or operatively coupled to one another to perform one or more functions of the network equipment 102.

The association rule-based policy suggestion engine 104 can receive input data, which can include information indicative of historical data 114 for various storage contexts. The input data can also include feedback data 116 (e.g., user feedback data). The historical data 114 and/or the feedback data 116 can be retained (e.g., stored), for example, in the at least one memory 106, the at least one data store 110, or another system component, including the association rule-based policy suggestion engine 104. The feedback data 116 can be utilized by the association rule-based policy suggestion engine 104 to update the historical data 114 (e.g., supplement the historical data 114). Such updated historical data can be stored as updated historical data. By utilizing feedback data 116, the need for deep expertise on application behavior and/or data mutation churn can be mitigated.

The association rule-based policy suggestion engine 104, based on the historical data 114, the feedback data 116, and/or the updated historical data, can generate output data, which can include information indicative of one or more data replication policies 118. The one or more data replication policies 118 can facilitate a decision related to which RPO should be utilized for replication and/or the remote system to which replication is most suitable. Accordingly, manual policy setting can be mitigated and an automatic way to suggest and/or dynamically apply a policy (or more than one policy) for data replication can be facilitated.

Information indicative of the suggested policy and/or of the policy that will be automatically implemented can be output to the user. For example, the information can be output visually, audibly, or in another perceivable format (e.g., an interface component associated with user equipment). If the user is satisfied with the suggested and/or automatically implemented policy, feedback data can include information indicative of approval for the implementation of the suggested policy without any modifications and/or configurations. Alternatively, if the policy is not suitable, the policy can be customized, rejected, and/or skipped (e.g., disregarded, or bypassed) on a per applicationtype basis. Such information related to approval, disapproval, customization, rejection, and/or bypassing of the policy for data replication can be fed back to the association rule-based policy suggestion engine 104 as the feedback data 116.

In implementations where there is no (or an inadequate amount of) historical data available to be utilized in order to decide on the policy suggestions, a default replication policy can be suggested based on a predefined replication policy metric. Therefore, an automatic replication policy suggestion based on the detected user storage context can help mitigate the use of inefficient replication policies and can allow for better usage of storage premises.

The association rule-based policy suggestion engine 104 can be a machine learning engine trained to derive policy associations for various storage contexts by assigning weights to represent user preferences. Table 1 below provides an example, non-limiting, content of a storage context that can be captured and its associated replication policy. Specifically, Table 1 depicts auto enable replication for a detected storage context.

TABLE 1

| StorageContext | Replication Policy |
|---|---|
| IO load, hardware type, Replication capacity, Workload: ex. Database, Historical RPO data, Network latency of remote system, Load of remote system Capacity of remote system(Storage) | Policy: {RPO: 5 minutes} alertThreshold remoteSystem |

The association rule-based policy suggestion engine 104 can be trained using historical storage array data which can be obtained from a Cloud IQ (e.g., a repository of aggregated storage context data collected from various machines and user install base). The storage context and policy associations can be pulled from various storage arrays to train the engine to suggest a policy by creating associations to the storage context for different workloads. More details related to this training are discussed below.

Using the trained engine (e.g., the association rule-based policy suggestion engine 104), policy suggestions can be made based on the detected storage context, the auto-enable replication policy preference of the users, and/or other considerations. According to some implementations, users can manually set the replication policy if they do not want the automatic implementation enabled.

If the detected context does not have a policy suggestion based on the trained data set, then a default policy can be suggested. The default policy can be created based on predefined parameter thresholds. An example, non-limiting, predefined parameter threshold can be: IO load: x, hardware type: Powerstore, Workload: Database, and NAS and file System objects of 500 has RPO set to 5 minutes and alert threshold as 60 minutes.

As another non-limiting example, a predefined parameter threshold for PowerStore hardware having database workload with replication capacity of 15 TB (including 20 NAS and 50 file systems objects). In this example, the user has set an RPO of 15 minutes and an alert threshold of 20 minutes Further, the user has selected remote system with network latency of 30 milliseconds, capacity of 30 TB, and IO load of 100 input/output operations per second (IOPS). Then, these values are given more weight based on the number of occurrences and the proposed policy will have the suggestions with maximum weights.

If the user modifies and/or rejects the suggested policy, then the association rule-based policy suggestion engine 104 can be updated with the associated feedback (e.g., feedback data 116) and appropriate weights can be added and/or removed. According to some implementations, the user might also skip the policy suggestion to apply later. FIGS. 2-6 below provide further details related to the automatic enablement of replication for detected storage context workflow as described with respect to FIG. 1.

Figure 2:
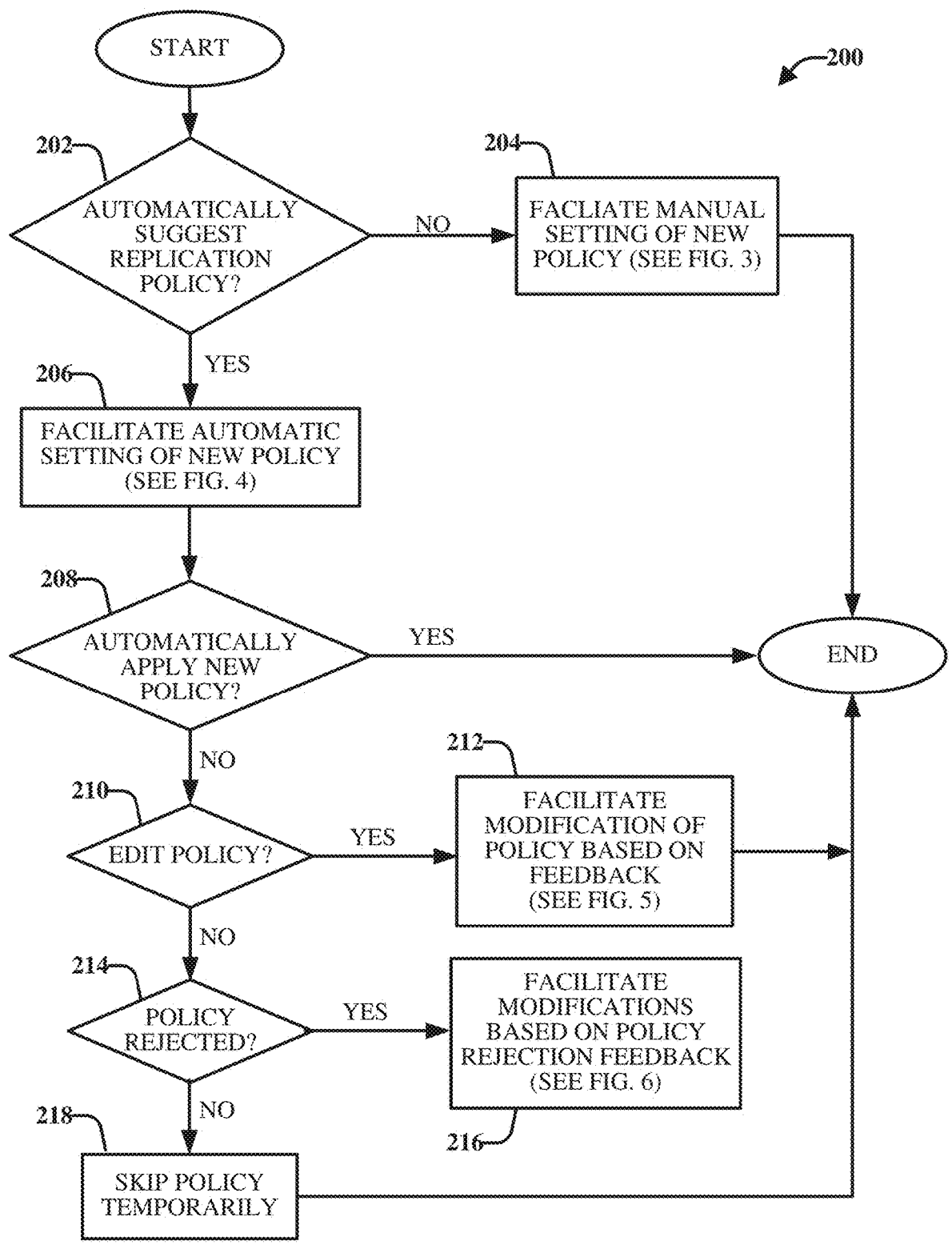
FIG. 2 illustrates a flow diagram of an example, non-limiting, computer-implemented method that facilitates auto enable replication for detected storage context in accordance with one or more embodiments described herein.

FIG. 2 illustrates a flow diagram of an example, non-limiting, computer-implemented method 200 that facilitates auto enable replication for detected storage context in accordance with one or more embodiments described herein. Repetitive description of like elements employed in other embodiments described herein is omitted for sake of brevity. The computer-implemented method 200 can be implemented by network equipment (e.g., the network equipment 102) comprising one or more processors and one or more memories. According to another example, the computer-implemented method 200 can be implemented by a system (e.g., the system 100) comprising one or more processors and one or more memories. According to some embodiments, the method 200 can be implemented by an association rule-based policy suggestion engine (e.g., the association rule-based policy suggestion engine 104 (e.g., an ARBPSE component)), which can comprise one or more processors and one or more memories.

The computer-implemented method 200 starts at 202 when a determination is made whether a replication policy should be automatically suggested. For example, the determination of whether to automatically suggest a replication policy can be based on user preferences, standard operating procedures, operator parameters, service level agreements, and so on.

If an automatic suggestion of a policy should not be performed ("NO"), the computer-implemented method 200 continues, at 204, with facilitation of a manual setting of a new policy, which will be discussed below with reference to FIG. 3. Alternatively, if it is determined, at 202, that automatic suggestion of a replication policy should be performed ("YES"), the computer-implemented method 200 continues at 206 and automatic setting of the new policy is facilitated, which will be discussed in further detail with respect to FIG. 4 below.

Upon or after the automatic setting of the new policy is facilitated, at 208, the computer-implemented method 200 determines whether to automatically apply the new policy. The determination at 208 can be based on setting and/or user feedback. For example, a setting can be to automatically apply the policy (e.g., automatically replicate data as discussed herein) without notifying a user. In another example, the setting can include instructions that approval from the user should be received before the policy is implemented and, therefore, information indicative of the suggested policy is provided to the user (e.g., via an interface component). In another example, if the user does not respond in a defined amount of time, the policy can be automatically implemented and/or aborted based on predefined criteria.

If the policy is to be automatically implemented ("YES"), the policy can be implemented and the method can end. Alternatively, if it is determined, at 208, that the new policy should not be automatically applied ("NO"), at 210, a determination is made whether the policy should be edited. For example, the editing (or configuration) of the policy can be based on user feedback associated with the recommended or suggested policy.

If the policy should be edited ("YES"), at 212, the computer-implemented method facilitates modification of the policy based on feedback information. Further details related to the modification of the policy will be provided with respect to FIG. 5 below.

Alternatively, if it is determined, at 210, that the policy is not to be edited ("NO"), a determination is made, at 214, whether the policy has been rejected (e.g., by the user or entity). If rejected ("YES"), at 216, modifications based on policy rejection feedback are facilitated, which will be discussed in further detail with respect to FIG. 6 below. Alternatively, if it is determined, at 214, that the policy is not rejected, at 218 the policy can be skipped, at least temporarily and the computer-implemented method 200 ends. In some implementations, if the policy is not rejected at 214, the policy can be automatically implemented and replication of the data on the target system can proceed.

Figure 3:
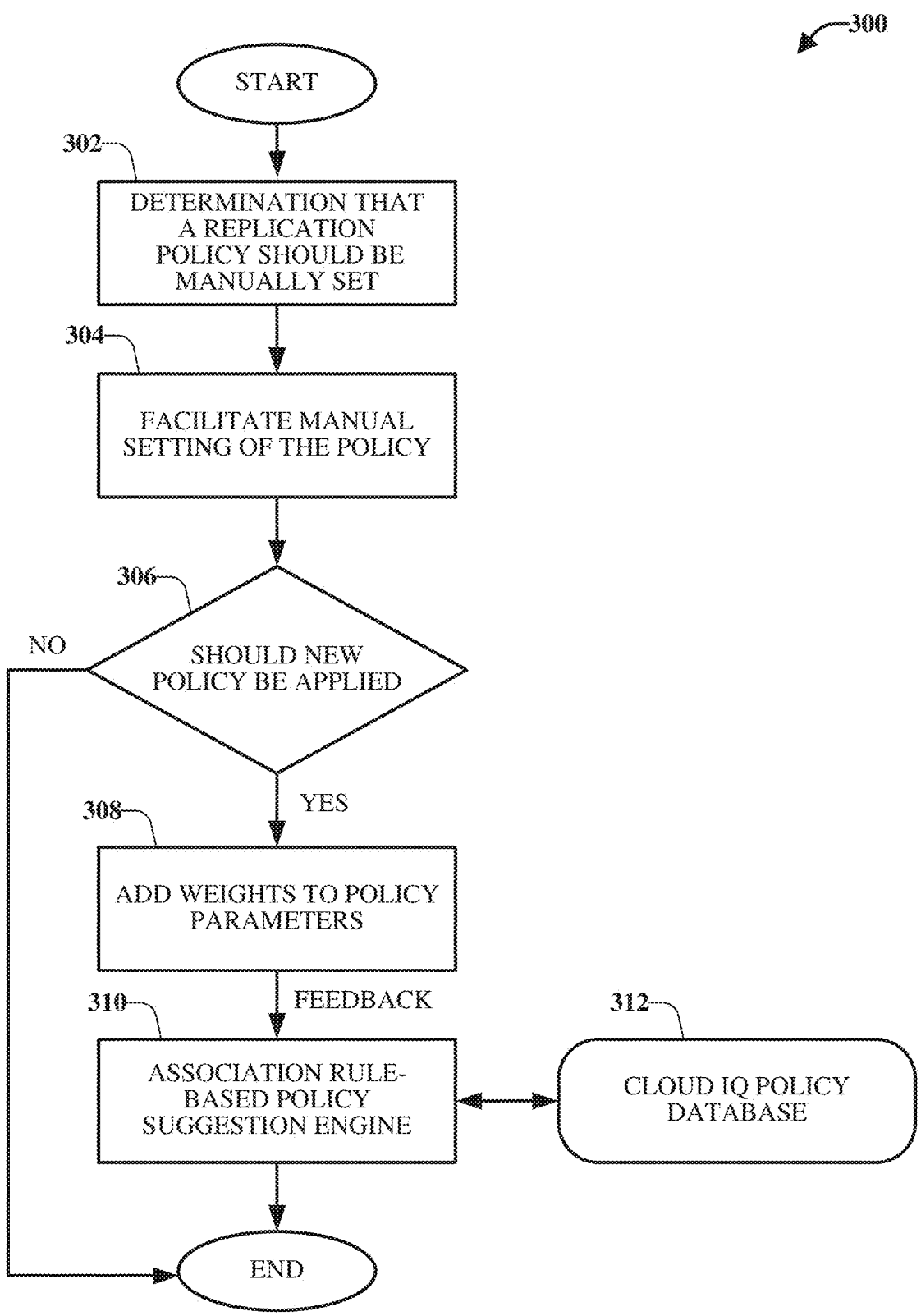
FIG. 3 illustrates a flow diagram of an example, non-limiting, computer-implemented method that facilitates a manual setting of a replication policy in accordance with one or more embodiments described herein.

FIG. 3 illustrates a flow diagram of an example, non-limiting, computer-implemented method 300 that facilitates a manual setting of a replication policy in accordance with one or more embodiments described herein. Repetitive description of like elements employed in other embodiments described herein is omitted for sake of brevity. The computer-implemented method 300 can be implemented by network equipment (e.g., the network equipment 102) comprising one or more processors and one or more memories. According to another example, the computer-implemented method 300 can be implemented by a system (e.g., the system 100) comprising one or more processors and one or more memories. According to some embodiments, the method 300 can be implemented by an association rule-based policy suggestion engine (e.g., the association rule-based policy suggestion engine 104 (e.g., an ARBPSE component)), which can comprise one or more processors and one or more memories.

The computer-implemented method 300 starts at 302, when it is determined that a replication policy should be manually set or established. For example, the determination at 302 can be made upon or after it is determined, at 202 of FIG. 2, that a replication policy should not be automatically suggested and, at 204, that manual setting of the new policy should be facilitated.

Upon or after the determination at 302, the policy can be manually set at 304. Manual setting of the policy can be based on information available to a user. As discussed above, there are various disadvantages associated with manual setting of a policy since users are not able to leverage apparatuses and/or technologies that are available for replicating data from a source system to a remote system. This inability can be based on an insufficient understanding and/or lack of experience with their data. Additionally, or alternatively, the inability to leverage the apparatuses and/or technologies can be based on application behavior and/or compliance norms (e.g., standards of behavior).

Upon or after the policy is manually set, a determination is made, at 306, whether the new policy should be applied. If not ("NO"), the computer-implemented method 300 ends. Alternatively, if it is determined, at 306, that the new policy should be applied ("YES"), at 308, one or more weights can be added to policy parameters. The respective values of the weights can be different for each parameter and can be based on user preferences. For example, if a first parameter is more important than a second parameter, a higher value can be assigned to the first parameter compared to the second parameter. In some cases, more than two parameters can have a same weight, or a similar weight.

As indicated, feedback data can be provided to the association rule-based policy suggestion engine at 310. The feedback data can include information related to the policy parameters and the respective weights applied to the parameters. The feedback data can be provided prior to implementation of the policy, during implementation of the policy, and/or after implementation of the policy. As illustrated, information from a cloud IQ policy database 312 can also provide input data to the association rule-based policy suggestion engine at 310. The feedback data and the information from the cloud IQ policy database can be utilized to train (or retrain) one or more models of the association rule-based policy suggestion engine, according to some implementations. Retraining the model based on feedback data can help to increase an accuracy level or a confidence level of the model.

Figure 4:
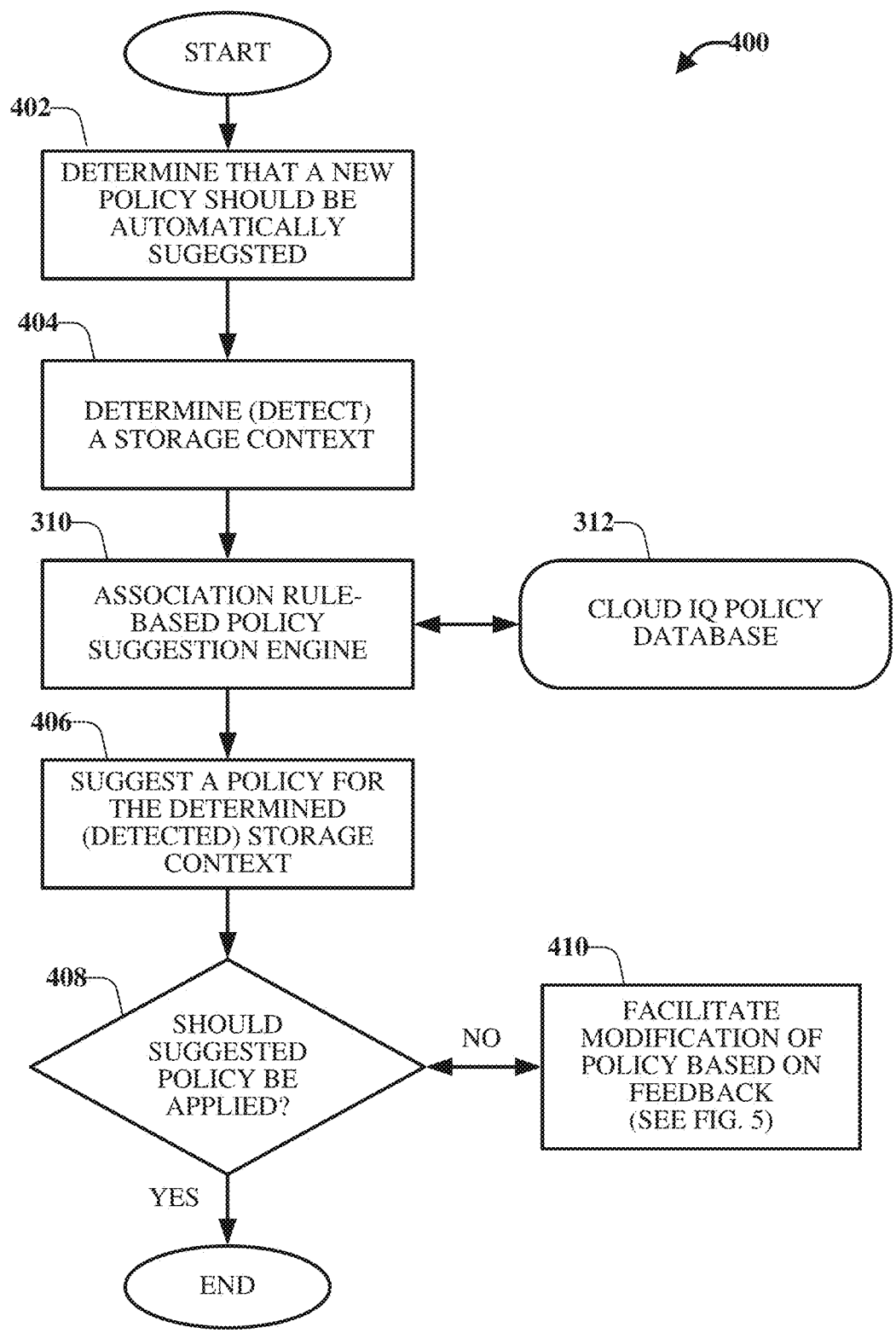
FIG. 4 illustrates a flow diagram of an example, non-limiting, computer-implemented method that facilitates automatic suggestion of a replication policy in accordance with one or more embodiments described herein.

FIG. 4 illustrates a flow diagram of an example, non-limiting, computer-implemented method 400 that facilitates automatic suggestion of a replication policy in accordance with one or more embodiments described herein. Repetitive description of like elements employed in other embodiments described herein is omitted for sake of brevity. The computer-implemented method 400 can be implemented by network equipment (e.g., the network equipment 102) comprising one or more processors and one or more memories. According to another example, the computer-implemented method 400 can be implemented by a system (e.g., the system 100) comprising one or more processors and one or more memories. According to some embodiments, the method 400 can be implemented by an association rule-based policy suggestion engine (e.g., the association rule-based policy suggestion engine 104 (e.g., an ARBPSE component)), which can comprise one or more processors and one or more memories.

At 402, it is determined that a replication policy should be automatically suggested. For example, the determination, at 402, can be made upon or after it is determined, at 202 of FIG. 2, that a replication policy should be automatically suggested and facilitation of an automatic setting of the new policy is implemented at 206.

Upon or after it is determined that the replication policy should be automatically suggested at 402, a storage context is determined at 404. As mentioned, a storage context is a combination of information indicative of one or more parameters. These parameters can include, but are not limited to: hardware type, workload (e.g., database), replication capacity, historical RPO data, configured remote system parameters (e.g., network latency, IO load, capacity of remote system (storage)), and other parameters that can be used to define a replication policy. The "Replication Policy" is a set of rules utilized to replicate data to a remote system.

Upon or after the storage context is determined, information is conveyed to the association rule-based policy suggestion engine 310. The information can be input information and can include information indicative of the determined storage context. Further, input data provided to the association rule-based policy suggestion engine 310 can include information from the cloud IQ policy database 312 (e.g., a CloudIQ). The input data can be utilized by the association rule-based policy suggestion engine 310 to train one or more models and/or utilize one or more trained models to suggest and/or automatically implement a policy.

Output of the association rule-based policy suggestion engine 310 is information indicative of a suggested policy for the determined (detected) storage context 406. An indication of the suggested policy (or alternatively policies) and/or an indication of a policy that will be automatically implemented can be output at 406 via an interface component associated with user equipment.

A determination whether to automatically apply the new policy is made at 408 (e.g., the determination at 208 of FIG. 2). For example, the determination can be made based on one or more rules associated with the selection and/or implementation of the replication policy. In another example, the determination can be made based on feedback from a user via the interface component.

If it is determined that the new policy should not be automatically applied ("NO"), at 410, modification of the policy can be facilitated, which will be discussed in further detail with respect to FIG. 5 below. Alternatively, if the new policy is to be automatically applied ("YES"), the new policy is applied (e.g., data is replicated to one or more target systems, which can be remote systems) and the computer-implemented method 400 ends.

Figure 5:
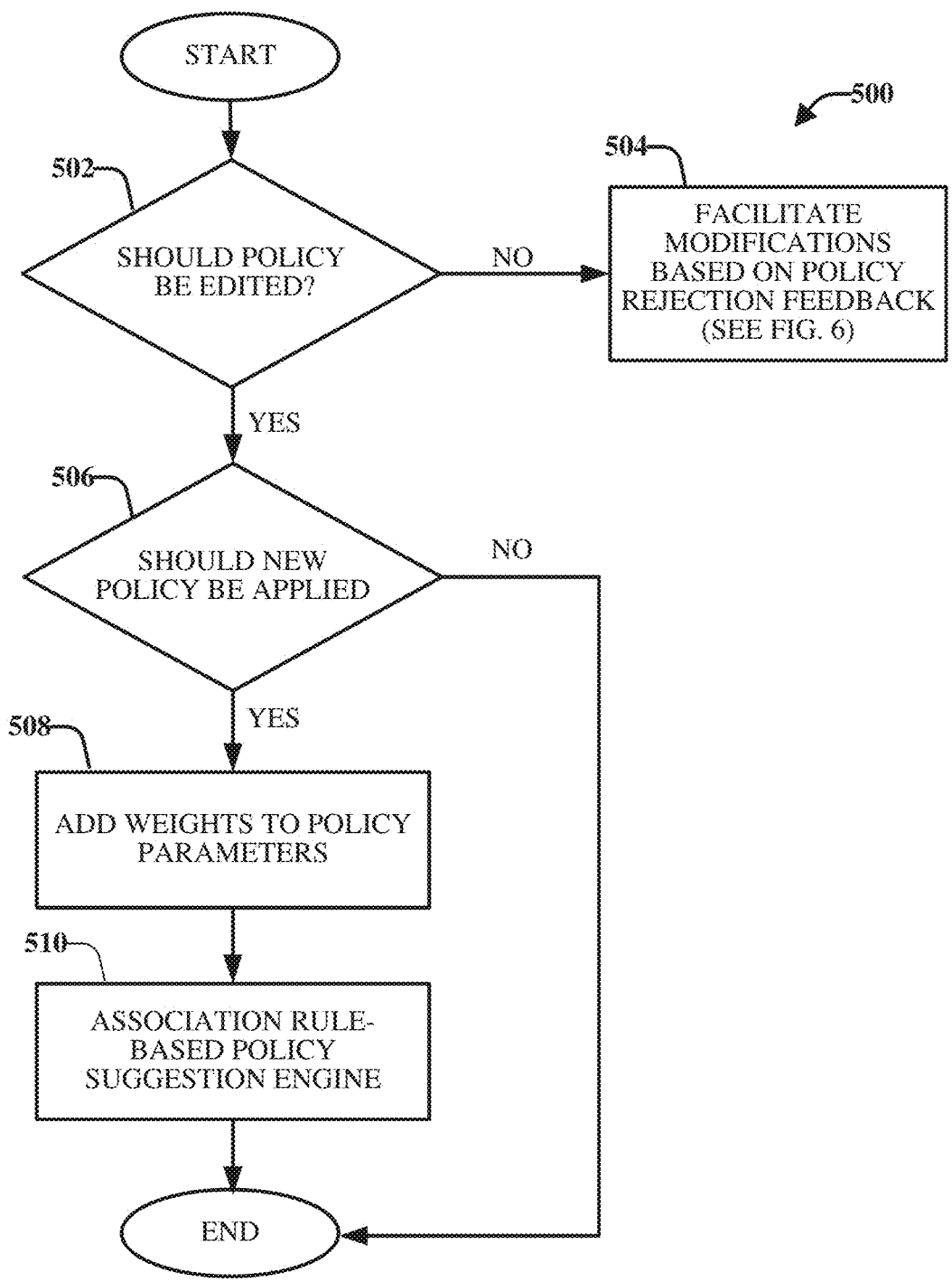
FIG. 5 illustrates a flow diagram of an example, non-limiting, computer-implemented method that facilitates modification of a policy in accordance with one or more embodiments described herein.

FIG. 5 illustrates a flow diagram of an example, non-limiting, computer-implemented method 500 that facilitates modification of a policy in accordance with one or more embodiments described herein. Repetitive description of like elements employed in other embodiments described herein is omitted for sake of brevity. The computer-implemented method 500 can be implemented by network equipment (e.g., the network equipment 102) comprising one or more processors and one or more memories. According to another example, the computer-implemented method 500 can be implemented by a system (e.g., the system 100) comprising one or more processors and one or more memories. According to some embodiments, the method 500 can be implemented by an association rule-based policy suggestion engine (e.g., the association rule-based policy suggestion engine 104 (e.g., an ARBPSE component)), which can comprise one or more processors and one or more memories.

At 502, a determination is made whether the policy should be edited. The determination, at 502, can be similar (or the same) as the determination at 210 of FIG. 2. If the policy should not be edited "NO," the computer-implemented method facilitates, at 504, modifications based on policy rejection feedback, which is discussed in further detail with respect to FIG. 6 below (e.g., 212 of FIG. 2).

Alternatively, if it is determined, at 502, that the policy should be edited ("YES"), at 506 another determination is made whether the edited policy should be applied. If the edited policy should not be applied ("NO"), the computer-implemented method 500 ends (e.g., replication of the data is not performed at this time). Alternatively, if it is determined, at 506, that the edited policy should be applied ("YES"), at 508, one or more weights can be added to parameters (e.g., similar to 308 of FIG. 3). At 510, the association rule-based policy suggestion engine receives feedback data, which can be utilized to retrain the model (e.g., to help increase an accuracy level or confidence level of the model (or more than one model)).

Figure 6:
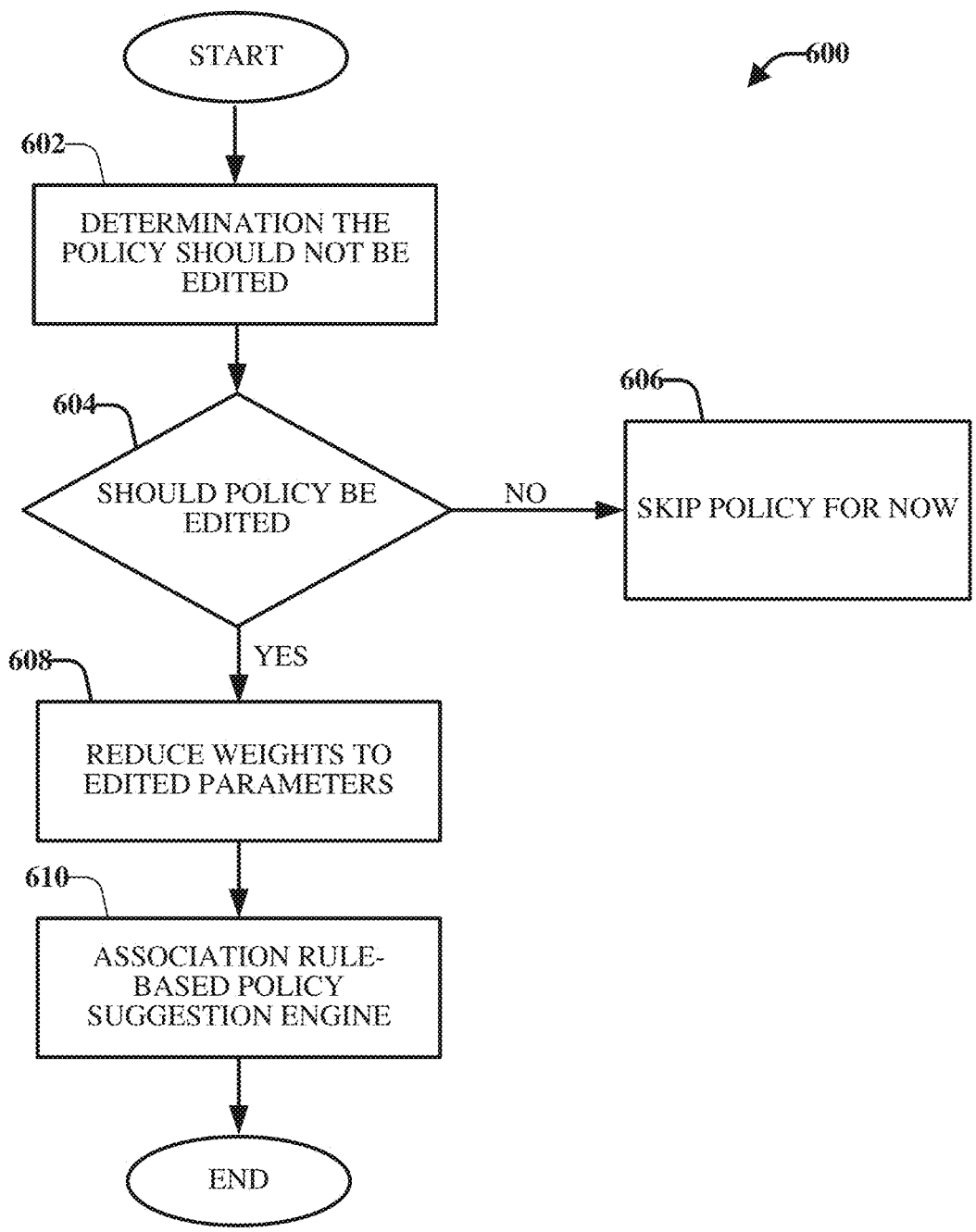
FIG. 6 illustrates a flow diagram of an example, non-limiting, computer-implemented method that facilitates modifications based on policy rejection feedback in accordance with one or more embodiments described herein.

FIG. 6 illustrates a flow diagram of an example, non-limiting, computer-implemented method 600 that facilitates modifications based on policy rejection feedback in accordance with one or more embodiments described herein. Repetitive description of like elements employed in other embodiments described herein is omitted for sake of brevity. The computer-implemented method 600 can be implemented by network equipment (e.g., the network equipment 102) comprising one or more processors and one or more memories. According to another example, the computer-implemented method 600 can be implemented by a system (e.g., the system 100) comprising one or more processors and one or more memories. According to some embodiments, the method 600 can be implemented by an association rule-based policy suggestion engine (e.g., the association rule-based policy suggestion engine 104 (e.g., an ARBPSE component)), which can comprise one or more processors and one or more memories.

The computer-implemented method 600 starts, at 602, when it is determined that the policy should not be edited (e.g., the determination at 210 and/or the determination at 502 and the action at 504) whether the edited policy should be rejected. Based on the determination not to edit the policy, at 604, a determination is made whether the policy should be accepted or rejected. If the policy should not be rejected, the policy can be skipped, at least temporarily at 604 and the computer-implemented method 600 ends. It is noted that skipping the policy is on a per application-type basis.

Alternatively, if it is determined, at 604, that the policy should be rejected ("YES"), at 608 the computer-implemented method 600 reduces one or more weights associated with one or more of the parameters, resulting in edited parameters. As noted previously, respective weights can be applied to various parameters and can be a function of user preferences associated with the various parameters.

Further, at 610, the association rule-based policy suggestion engine receives feedback and the computer-implemented method 600 ends. The feedback data can include information related to the policy parameters and the respective weights applied to the parameters and/or the edited parameters based on the reduction of one or more weights at 608. The feedback data can be utilized to retrain the model(s) (e.g., to help increase an accuracy level or confidence level of the model(s)).

Figure 7:
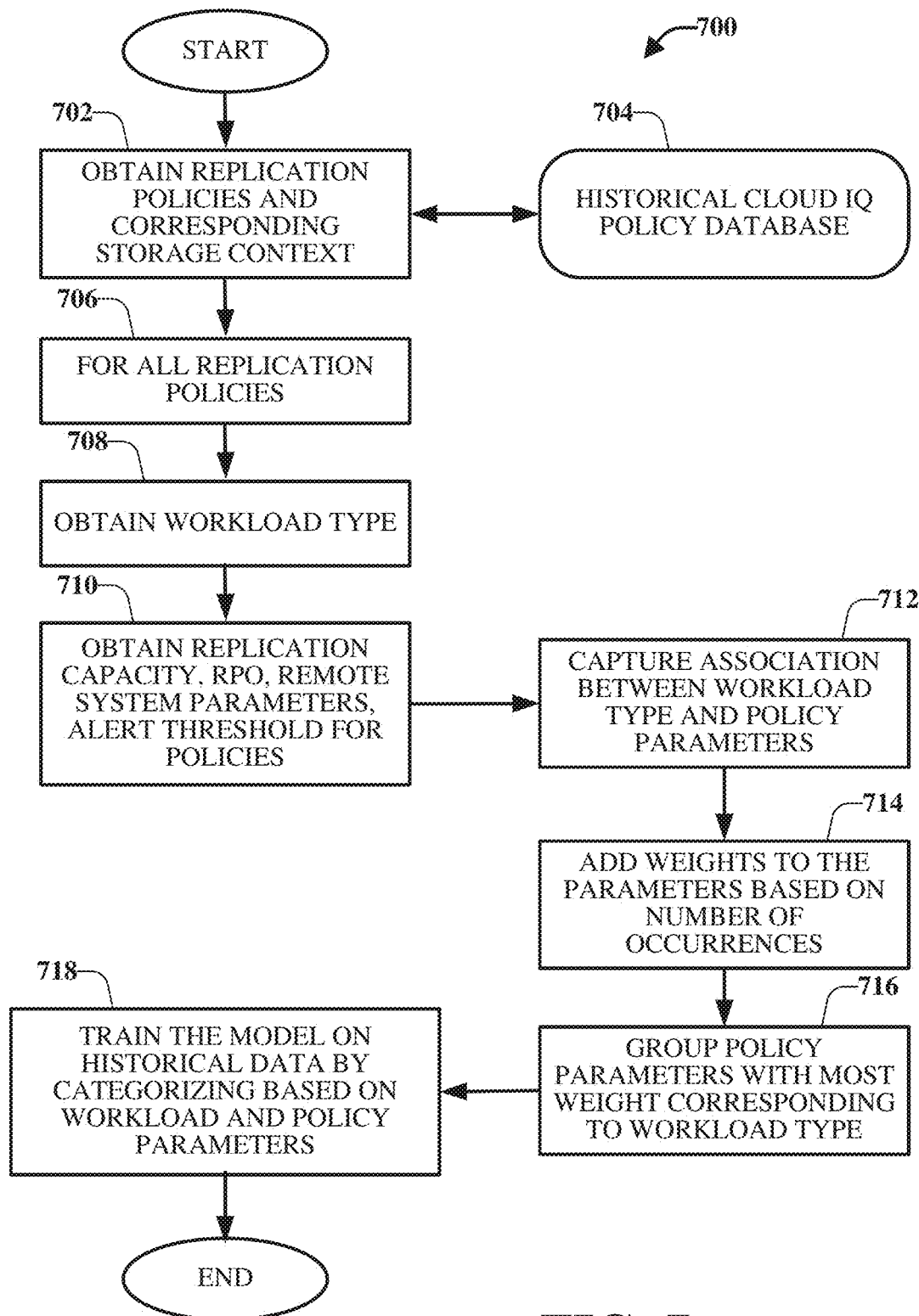
FIG. 7 illustrates a flow diagram of an example, non-limiting, computer-implemented method that trains a model in order to facilitate auto enable replication for detected storage context in accordance with one or more embodiments described herein.

FIG. 7 illustrates a flow diagram of an example, non-limiting, computer-implemented method 700 that trains a model in order to facilitate auto enable replication for detected storage context in accordance with one or more embodiments described herein. Repetitive description of like elements employed in other embodiments described herein is omitted for sake of brevity. The computer-implemented method 700 can be implemented by network equipment (e.g., the network equipment 102) comprising one or more processors and one or more memories. According to another example, the computer-implemented method 700 can be implemented by a system (e.g., the system 100) comprising one or more processors and one or more memories. According to some embodiments, the method 700 can be implemented by an association rule-based policy suggestion engine (e.g., the association rule-based policy suggestion engine 104 (e.g., an ARBPSE component)), which can comprise one or more processors and one or more memories.

As discussed herein, association rule-based machine learning is used for discovering one or more associations between workload type, hardware type, Replication capacity, Network latency to remote system, load on remote system, available capacity of remote system and replication policies (alert threshold, RPO, remoteSystem) associated. For example, if there is a Powerstore hardware with database workload and replication capacity of 15 TB has a replication policy set to an RPO of 5 minutes, alert threshold of 30 minutes, and selected remote system with network latency of 5 milliseconds, IO load of 100 IOPS and available capacity of 50 TB. Then this is given more weight (e.g., a higher weighting factor) as compared to weights applied to other parameters.

If there is only one remote system (e.g., a single target system to which data can be replicated), then that remote (or target) system is selected by default. If there are multiple remote systems associated and to which data can be replicated, then an association is formed to one or more of the remote systems based on the historical preference of users (e.g., based on historical data 114, feedback data 116, and/or other data associated with previous replication policy determinations. This association can be formed between the type of hardware, workload, replication capacity and RPO, alert threshold and remote system based on one or more policies identified (or set) by the user and helps to arrive at (e.g., determine) policy suggestions based on the detected storage context.

According to some implementations, the remote system parameters are fetched through remote command execution on the remote system. For example, information can be requested from the remote system and, based on a response received from the remote system, the remote system parameters can be determined. Alternatively, or additionally, remote system parameters can be stored in a centralized memory or storage medium and can be obtained from the stored parameters.

Also, weights can be assigned to the replication policy parameters based on a number of occurrences in different policies, which can help to identify user preferences. Therefore, the final policy suggested will have the policy parameters set which have maximum weight.

If all policy parameters have the same weight, then the higher parameter value is considered. For example, if weight of RPO set by a user is 5 minutes and the same weight as parameter RPO of 10 minutes, then 10 minutes will be considered as that higher parameter value since 10 minutes covers 5 minutes (e.g., 5 minutes is included in 10 minutes). Similarly, if remote systems with capacity of 50 TB and 30 TB have equal weights, then remote system with 50 TB will be selected as it covers (includes) the 30 TB capacity as well. Therefore, when a logs only workload is detected, then policy suggestion is determined by considering similar workload and the preference set previously by users.

In a similar manner, for the sequential workloads, the engine (e.g., the association rule-based policy suggestion engine 104) is trained to determine and assess the customer preference and the RPO, alert threshold, and the remote system is selected accordingly. Thus, training the model on different workloads and storage arrays will enable automatic determination of an appropriate policy.

In further detail, the computer-implemented method 700 begins with obtaining replication policies and corresponding storage context, at 702. For example, the replication policies and corresponding storage context can be obtained from one or more historical cloud IQ databases 704. In another example, the computer-implemented method 700 captures the Association Rule-Based Policy Suggestion Engine (AR-BPSE), auto-suggestion of new policy (e.g., at 410 of FIG. 4), policy modification/rejection feedback (e.g., at 510 of FIG. 5 and 610 of FIG. 6) and skip policy (e.g., at 604 of FIG. 6) workflows.

As indicated, at 706, the replication policies and corresponding storage context can be obtained for all replication policies, according to some implementations. Further, at 708 the workload type is obtained. At 710 of the computer-implemented method 700, various information is obtained such as, but not limited to, replication capacity, RPO, remote system parameters, and/or alter thresholds for policies.

The association between workload type and policy parameters is captured at 712. Weights are added to the parameters at 714. For example, the weights can be added based on the number of occurrences. Further, at 716, the group policy parameters with the most weight corresponding to workload type are selected. At 718, the model is trained on historical data by categorizing based on workload and policy parameters. As discussed above, over time when replication policies are suggested, approved, rejected, and/or implemented, various feedback data can be utilized to retrain the model. Such retraining can occur continually, after a defined amount of feedback data is received, after a defined number of cycles, or when a confidence level (or accuracy level) of the model no longer satisfies a defined confidence level.

Figure 8:
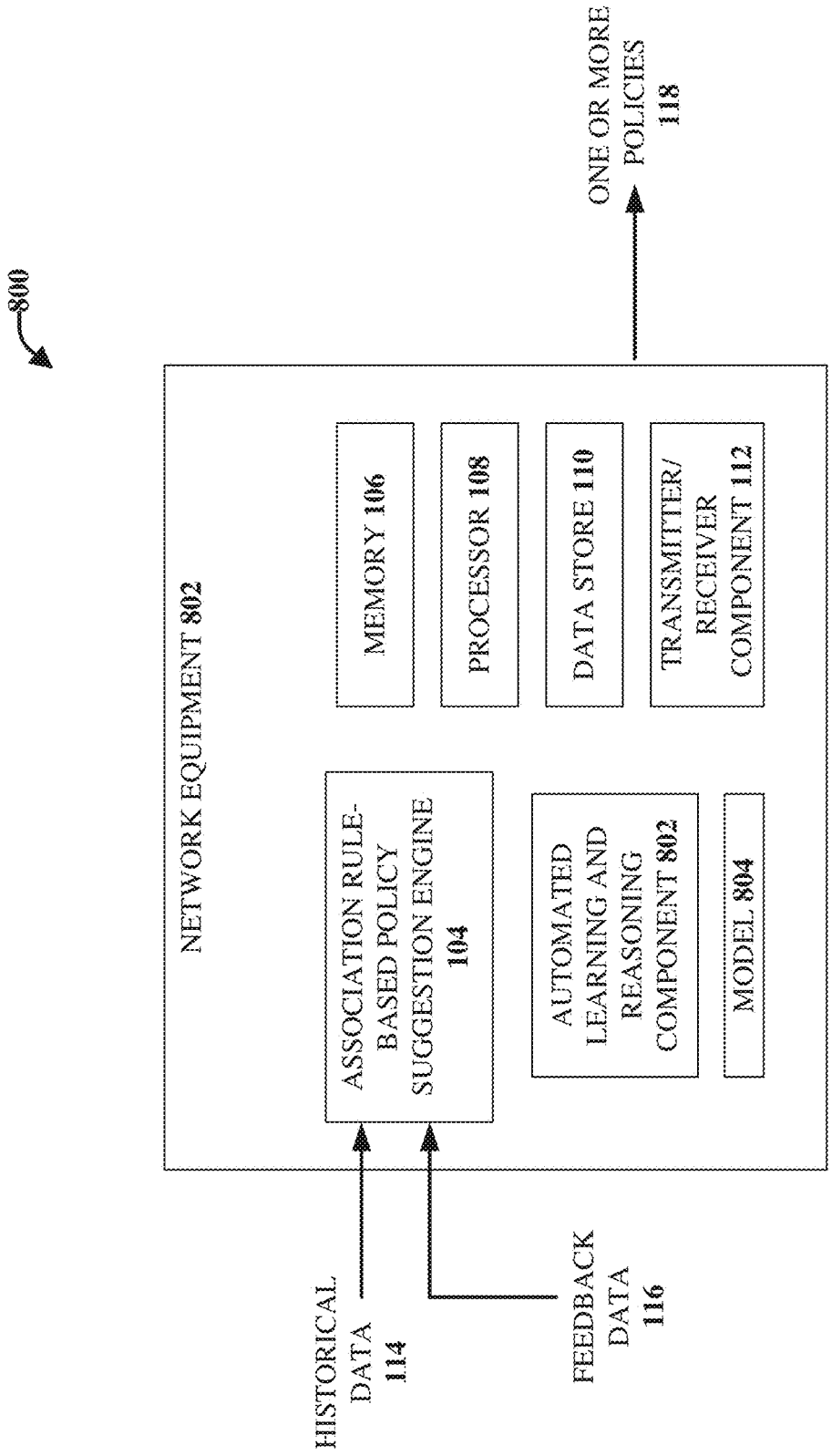
FIG. 8 illustrates an example, non-limiting, system that employs automated learning that trains a model to facilitate one or more of the disclosed aspects in accordance with one or more embodiments described herein.

FIG. 8 illustrates an example, non-limiting, system 800 that employs automated learning that trains a model to facilitate one or more of the disclosed aspects in accordance with one or more embodiments described herein. Repetitive description of like elements employed in other embodiments described herein is omitted for sake of brevity. The system 800 can comprise one or more of the components and/or functionality of the network equipment 102, the computer-implemented method 200, the computer-implemented method 300, the computer-implemented method 400, the computer-implemented method 500, the computer-implemented method 600, the computer-implemented method 700, and vice versa.

The system 800 can utilize machine learning to train a model to identify an opportunity to automatically enable replication for detected storage context based on a defined replication policy. The model can be trained to a defined confidence level. As illustrated, the system 800 can comprise a machine learning and reasoning component 802 (e.g., the machine learning engine and/or the association rule-based policy suggestion engine 104) that can be utilized to automate one or more of the disclosed aspects based on training a model 804. The machine learning and reasoning component 802 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 802 can employ principles of probabilistic and decision theoretic inference. Additionally, or alternatively, the machine learning and reasoning component 802 can rely on predictive models (e.g., the model 804) constructed using automated learning and/or automated learning procedures. Logic-centric inference can also be employed separately or in conjunction with probabilistic methods.

The machine learning and reasoning component 802 can infer which policy should be suggested and/or automatically implemented based on detected context. For example, the detected context can be storage context, which is a combination of information indicative of one or more parameters. These parameters can include, but are not limited to: hardware type, workload (e.g., database), replication capacity, historical Recovery Point Objective (RPO) data, configured remote system parameters (e.g., network latency, Input/Output (IO) load, capacity of remote system (storage)), and other parameters that can be used to define a replication policy. The "Replication Policy" is a set of rules utilized to replicate to a remote system.

Additionally, or alternatively, the machine learning and reasoning component 802 can infer which policy should be suggested and/or automatically implemented based on feedback data. The feedback data can be a response received based on previously suggested, automatically implemented policies, policies that are manually established and implemented, and so on.

As used herein, the term "inference" refers generally to the process of reasoning about or inferring states of a system, a component, a module, an environment, and/or devices from a set of observations as captured through events, reports, data and/or through other forms of communication. Inference can be employed to identify when to suggest and/or dynamically implement a policy, which policy to suggest, an identification of a destination or target system, and so on, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with automatic enabled replication for detected storage context) can employ various artificial intelligence-based schemes for conducting various aspects thereof. For example, a process for determining various storage contexts (which can be previously known storage contexts or previously unknown storage contexts), determining a replication policy based on historical data and/or feedback data, the respective values of weights to apply to one or more parameters, and so forth can be enabled through an automatic classifier system and process.

A classifier is a function that maps an input attribute vector, $x=(x1, x2, x3, x4, xn)$, to a confidence that the input belongs to a class. In other words, $f(x)$=confidence (class). Such classification can employ a probabilistic and/or statistical-based analysis (e.g., factoring into the analysis utilities and costs) to provide a prognosis and/or infer one or more actions that should be employed to determine whether a replication policy should be suggested and/or automatically implemented and/or the various steps associated with the computer-implemented methods discussed with respect to FIGS. 2-7.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing historical data associated with previous data replication, feedback data associated with data replication policies, whether such policies are accepted or denied by receiving extrinsic information (e.g., one or more signals from various equipment), by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when to suggest a particular replication policy, when to add weights to one or more parameters and the respective values of the weights for the one or more parameters, when to automatically implement a policy, and so forth. The criteria can include, but is not limited to, historical information, previously assigned weights to a parameter, user feedback associated with acceptance and/or rejection of a policy, user feedback associated with modification of a suggested policy, and so forth.

According to some implementations, seed data (e.g., a data set) can be utilized as initial input to the model 804 to facilitate the training of the model 804. In an example, if seed data is utilized, the seed data can be obtained from one or more historical data associated with storage context, previous data replications, feedback associated with previously implemented data replications and/or suggested data replication policies, whether accepted or not, and so on. However, the disclosed embodiments are not limited to this implementation and seed data is not necessary to facilitate training of the model 804. Instead, the model 804 can be trained on new data received (e.g., via a feedback loop). Further, in the absence of seed data, a default policy can be applied, at least initially until enough data is obtained to train a model (or more than one model) to a defined level of confidence.

The at least one memory 106 can be operatively connected to the at least one processor 108. The at least one memory 106 can store executable instructions and/or computer executable components that, when executed by the at least one processor 108 can facilitate performance of operations (e.g., the operations discussed with respect to the various use cases, automatic enable replication for detected storage context, methods, and/or systems discussed herein). Further, the at least one processor 108 can be utilized to execute the computer executable components stored in the at least one memory 106.

Further, the at least one memory 106 can facilitate action to control communication between the network equipment 102 other network equipment, and/or various user equipment, such that the network equipment 102 employs stored protocols and/or algorithms to achieve improved overall performance based on automatically enabled replication for detected storage context as described herein.

It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 108 can facilitate respective analysis of information related to facilitating automatic enabled replication for detected storage context in advanced networks. The at least one processor 108 can be a processor dedicated to analyzing and/or generating information received, a processor that controls one or more components of the network equipment 102, and/or a processor that both analyzes and generates information received and controls one or more components of the network equipment 102.

The transmitter/receiver component 112 can receive information and/or can return information indicative of storage context and related information and the suggestion and/or automatic implementation of a data replication policy. The transmitter/receiver component 112 can be configured to transmit to, and/or receive data from, for example, one or more network equipment, and/or one or more user equipment. Through the transmitter/receiver component 112, the network equipment 102 can concurrently transmit and receive data, can transmit and receive data at different times, or combinations thereof.

According to some implementations, an interface component can provide a Graphical User Interface (GUI), a command line interface, a speech interface, Natural Language text interface, and the like. For example, a GUI can be rendered that provides an entity with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the entity did want the action performed.

As utilized herein an entity can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (VGA)) with limited graphic support, and/or low bandwidth communication channels.

As discussed, conventionally there is no way to auto-suggest a replication policy for the detected storage context. The replication policies are static conventionally. Various embodiments provided herein can propose one or more storage context aware replication policies based on historical data. Also provided is the ability to incorporate user feedback into policy suggestion. The ability to propose efficient replication policy for detected known storage context is provided with the disclosed embodiments. Additionally, the ability to identify RPO for replication for detected known storage context is provided. Further, the ability to select remote system for replication based on detected storage context is provided with the disclosed embodiments.

It should be noted that terms such as "real-time," "near real-time," "dynamically," "instantaneous," "continuously," and the like can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 second) control of RAN elements and their resources through applications, e.g., specialized applications called rApps. Example, non-limiting Near-Real Time RAN Intelligent Controller (Near-RT RIC) functions enable near-real-time optimization and control and data monitoring of O-CU and O-DU nodes in near-RT timescales (e.g., a second range of time representing less time than the first time range, such as between 10 milliseconds and 1 second). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RAN Intelligent Controller (RT RIC) is designed to manage network functions at real time timescales (e.g., a third range of time representing less time than the first time range and the second time range, such as <10 milliseconds).

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Aspects of systems, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
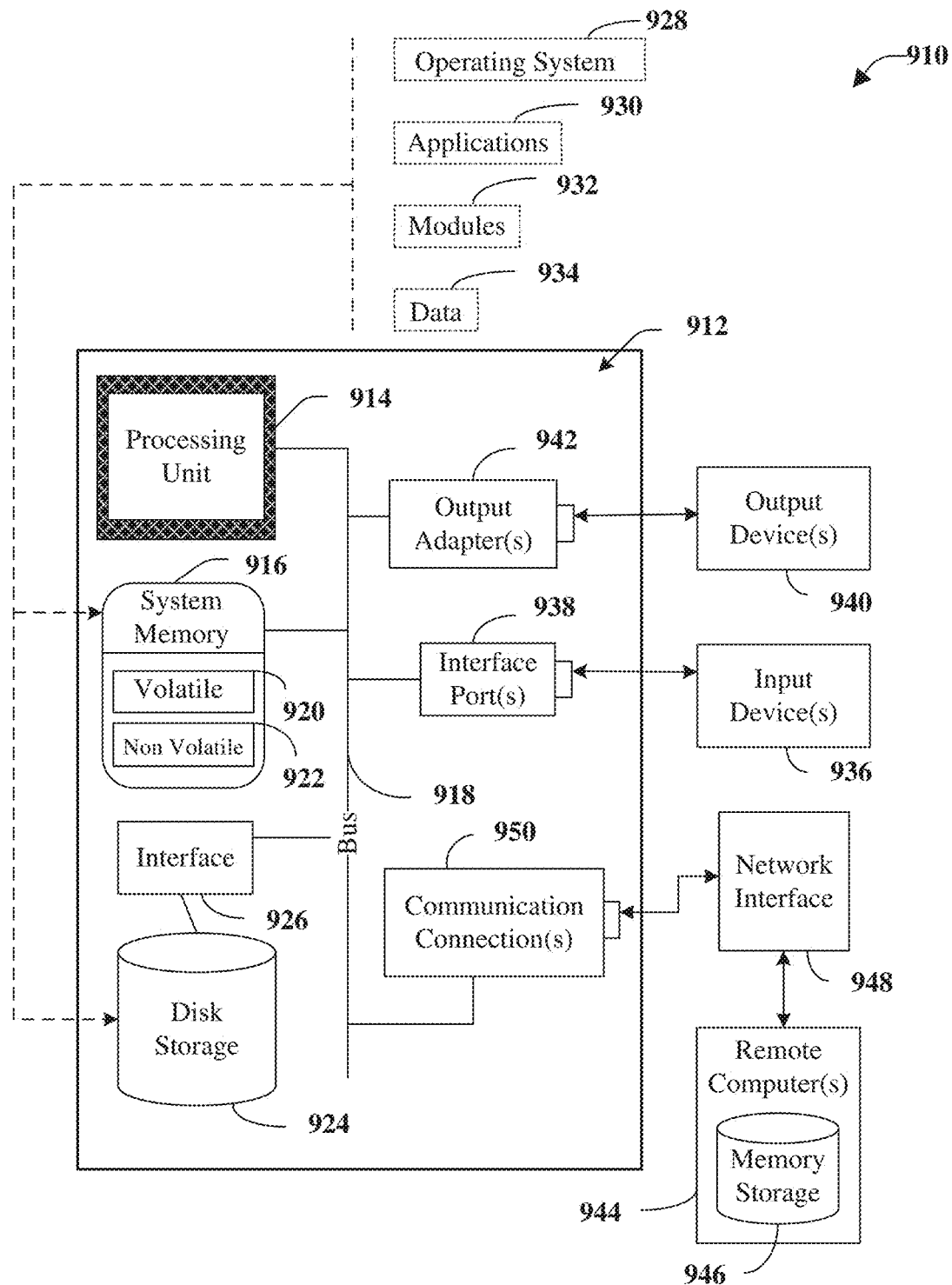
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
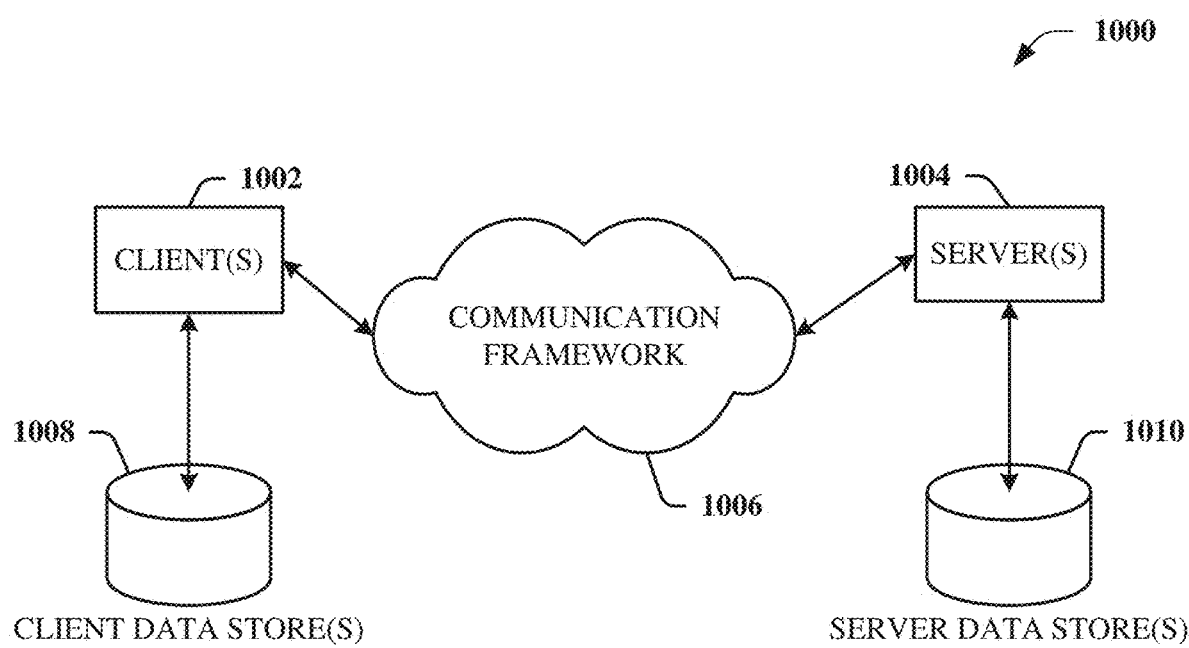
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    determining, by a system comprising at least one processor, that data, stored in a source system, is to be replicated to a target system;
    assigning, by the system, respective weights to replication policy parameters, wherein the assigning comprises, based on a determination that two replication policy parameters of an identified policy comprise a same weight, selecting a replication policy parameter of the two replication policy parameters determined to have a higher parameter value than the other replication policy parameter of the two replication policy parameters and setting the weight of the identified policy as a respective weight of the identified policy;
    based on historical data related to a storage context and the respective weights, determining, by the system, a replication policy for a replication of the data to the target system, wherein the replication policy comprises at least one rule utilized to replicate the data to a remote system; and
    based on an acceptance of the replication policy, facilitating, by the system, the replication of the data to the target system according to the replication policy.

2. The method of claim 1, further comprising:
    prior to the determining of the replication policy, receiving, by the system, user reinforced feedback data associated with a previous replication of data from the source system to the target system or another target system, wherein the determining of the replication policy comprises determining the replication policy based on the historical data and the user reinforced feedback data.

3. The method of claim 1, wherein the determining of the replication policy comprises:
    training, by the system employing artificial intelligence, a model using historical storage array data as training input, wherein the training comprises training the model to a defined confidence level, resulting in a trained model; and
    based on the trained model, facilitating, by the system, implementation of a storage context aware replication policy.

4. The method of claim 3, further comprising:
    based on the facilitating of the implementation of the storage context aware replication policy, receiving, by the system, feedback data; and
    retraining, by the system, the model based on the feedback data, resulting in a retrained model.

5. The method of claim 1,
    wherein the respective weights identify user preferences.

6. The method of claim 1, wherein the determining of the replication policy comprises determining a recovery point objective for the replication.

7. The method of claim 1, wherein the determining of the replication policy comprises selecting the target system from a group of target systems, and wherein the selecting is based on the storage context of the target system as compared to other storage contexts of the other target systems of the group of target systems.

8. The method of claim 1, wherein the determining of the replication policy comprises selecting a default policy based on a predefined replication policy metric.

9. The method of claim 1, further comprising:
    based on a rejection of the replication policy, facilitating, by the system, customization of the replication policy.

10. The method of claim 1, wherein the storage context comprises a combination of information comprising parameter information indicative of at least one parameter used to define the replication policy.

11. A system, comprising:
at least one processor; and
at least one memory that stores executable instructions that, when executed by the at least one processor, facilitate performance of operations, comprising:
determining that data, stored in a source system, is scheduled for replication to a target system;
setting respective weights to respective policy parameters, wherein based on a determination that a policy is assigned two policy parameters having a same weight,
selecting a policy parameter of the two policy parameters determined to have a higher parameter value as compared to the other policy parameter of the two policy parameters, resulting in a selected policy parameter, and
setting the weight of the selected policy parameter as a respective weight of the policy;
based on historical storage context data and the respective weights, determining a replication policy for the replication of the data to the target system; and
based on acceptance of the replication policy, causing the replication of the data to the target system.

12. The system of claim 11, wherein the operations further comprise:
prior to the determining of the replication policy, receiving user reinforced feedback data associated with a previous replication of data from the source system to the target system or another target system, and
wherein the determining of the replication policy comprises determining the replication policy based on the storage context data and the user reinforced feedback data.

13. The system of claim 11, wherein the determining of the replication policy comprises:
based on employing historical storage array data as training input, training via artificial intelligence, a model to a defined confidence level, resulting in a trained model; and
based on the trained model, causing a storage context aware replication policy to be implemented.

14. The system of claim 13, wherein the operations further comprise:
based on the causing of the storage context aware replication policy to be implemented, receiving feedback data; and
retraining the model based on the feedback data, resulting in a retrained model.

15. The system of claim 11, wherein the determining of the replication policy comprises selecting the target system from a group of target systems, and wherein the selecting is based on the historical storage context data of the target system.

16. The system of claim 11,
wherein the respective weights identify user preferences.

17. The system of claim 11, wherein the historical storage context data comprises information indicative of parameters used to define the replication policy.

18. A non-transitory machine-readable medium, comprising executable instructions that, when executed by at least one processor of network equipment, facilitate performance of operations, wherein the operations comprise:
determining that data, stored in a source system, is to be replicated to a target system;
assigning respective weights to replication policy parameters, wherein the assigning comprises, based on a determination that two replication policy parameters of a defined policy comprise a same weight, selecting a replication policy parameter of the two replication policy parameters determined to have a higher parameter value than the other replication policy parameter of the two replication policy parameters and setting the weight of the defined policy as a respective weight of the defined policy;
based on historical data related to a storage context and the respective weights, determining a replication policy for a replication of the data to the target system; and
based on an acceptance of the replication policy, facilitating the replication of the data to the target system according to the replication policy.

19. The non-transitory machine-readable medium of claim 18, wherein the determining of the replication policy comprises:
training, using machine learning, a model using historical storage array data as training input, wherein the training comprises training the model to a defined confidence level, resulting in a trained model; and
based on the trained model, enforcing a storage context aware replication policy.

20. The non-transitory machine-readable medium of claim 19, wherein the operations further comprise:
based on the enforcing of the storage context aware replication policy, receiving feedback data;
retraining the model based on the feedback data, resulting in a retrained model; and
enforcing the storage context aware replication policy based on the retrained model.

* * * * *